United States Patent [19]

Harper

[11] 3,775,135

[45] Nov. 27, 1973

[54] NON-FERROUS LITHOGRAPHIC PRINTING PLATE GLASSING COMPOSITION

[76] Inventor: James E. Harper, 6040 Haverhill St., Oxon Hill, Md.

[22] Filed: May 4, 1972

[21] Appl. No.: 250,227

Related U.S. Application Data

[62] Division of Ser. No. 819,110, April 24, 1969, Pat. No. 3,696,746.

[52] U.S. Cl. .................... 106/2

[51] Int. Cl. ....... C09d 5/20, C09k 3/00, C09k 3/18

[58] Field of Search ............... 101/451, 465; 106/2; 96/33

[56] References Cited

UNITED STATES PATENTS

| | | | |
|---|---|---|---|
| 3,030,210 | 4/1962 | Chebiniak | 96/33 |
| 3,110,596 | 11/1963 | Heiss et al. | 96/33 |
| 3,148,984 | 9/1964 | Harper | 96/33 |
| 3,354,825 | 11/1967 | Pickard | 101/451 |

*Primary Examiner*—David Klein
*Attorney*—Donald A. Gardiner, Jr. et al.

[57] ABSTRACT

Non-ferrous lithographic printing plates, and especially those in which the hydrophobic image areas are constituted by photosensitive polymers, are desensitized by application to the metal surface of the developed plate of an aqueous desensitizing solution comprising a phosphate glass such as sodium hexametaphosphate, preferably in admixture with a fluoride salt, such as sodium fluoride. The aqueous composition is maintained at a pH in the range of pH 5-7 by a water-soluble phosphorus acid, such as phosphoric acid. The treatment can be performed at room temperature and permits the hydrophylic areas of the printing plate to be maintained upon storage without special protection. The treatment can also be used as a fountain solution in a press fountain.

3 Claims, No Drawings

NON-FERROUS LITHOGRAPHIC PRINTING PLATE GLASSING COMPOSITION

This is a division of application Ser. No. 819,110, filed Apr. 24, 1969, now U.S. Pat. No. 3,696,746.

BACKGROUND OF INVENTION

The photolithographic printing process, being planographic in character, (both printing and non-printing areas lie in the same plane) is, of necessity, a process of continual compromise. The plate, usually of aluminum or zinc, must be completely hydrophobic (grease acceptive, water repelling) in the printing areas and correspondingly hydrophilic (water acceptive and grease repelling) in the non-printing areas.

For many years the preparation of a lithographic plate has required a number of necessary processing steps to accomplish the twin objectives described above. In the earlier stages of the art, the surface of the sheet was uniformly roughened (grained) by placing it upon an oscillating table while covered with an abrasive slurry and a layer of glass or steel marbles for a period of several minutes. The grained plate was then washed, dried, and stored until ready for use. At the time of use the plate was usually "counter-etched" by extended immersion in a dilute acid solution, followed by a thorough scrubbing under running water with a soft bristle brush. Excess water was removed and the plate then subjected to a second protracted scrubbing, known as "pre-etching" under a solution compounded from water, gum arabic, phosphoric acid, chromealum, and tannic acid. In turn, the pre-etch composition was rinsed off and the plate made sensitive to light through application of a thin layer of an aqueous solution of egg albumin and ammonium or potassium bichromate which was thoroughly dried. After this preparation, a plate was ready for use in which it was exposed through a line negative to a suitable light source. After exposure, the areas exposed to the light become completely insolubilized and resist washing to form the positive ink acceptive printing image on the plate. The areas which are not exposed are then washed free of unexposed coating to expose the hydrophylic substrate and excess moisture is removed. A thin "desensitizing" layer of the previously mentioned pre-etching solution is then spread over the plate and buffed dry. Plates so processed are then ready for the press and, from that time forward, the non-printing areas could not be permitted to dry without surface protection. If, for any reason, a press stoppage occured, the pressman promptly covered the plate with a thin film of acidified gum arabic to prevent surface oxidation with resultant scumming and ink catch up in the non printing areas. Despite the difficulties noted, the above process is still in use today.

A further development in the art subsequently eliminated much of the necessity for extreme care against oxidization. This event was the invention of the first commercially workable presensitized offset plate in 1955. These plates consist of thin aluminum sheets sheathed in an inert isolating layer of a hard, thin, insolubilized sodium silicate or like material.

The silicate layers are completely compatible with both the aluminum and a class of light sensitive diazo sensitizers having reasonably good stability enabling the plates to be preprepared and stored for reasonably long periods of time.

The sodium silicate coatings also were and are hydrophilic in character and provide firm anchorage for the exposed diazo dyes with which the plates are sensitized. These hydrophilic layers are applied to aluminum by extended immersion in hot solutions at temperatures ranging from 185° F. to 212° F.

However, while oxidation of the aluminum is prevented, the silicate areas inherently were spotty in that, in a given area, they retain greater or lesser degrees of ink acceptivity. Thus, it was necessary to continue the practice of laying down a thin film of acidified gum arabic or other desensitizing agent on the exposed and developed plate before it could be subjected to protracted periods of storage before or after usage. These films provide protection only so long as they remained on the plate surface, apparently forming little if any chemical combination with the non-printing areas. They are washed off by the pressman before beginning to print and are replaced by the pressman at the end of the press run, if the plate was to be stored for future use.

With the rapid advance in polymer chemistry, it has been discovered that certain solvent soluble substances have light-sensitive properties and thus hold out the possibility of the manufacture of pre-sensitized plates having an even more extended shelf life before use than the diazo presensitized plates. As with almost every development, the advantages to be gained by the use of such light-sensitive polymers are not without some offsetting disadvantages, not the least of which is the fact that such polymers, almost without exception, fail to adhere with any degree of consistency to hydrophilic substrates such as the silicate coatings noted after they have been exposed. In those instances where satisfactory image anchorage has been obtained, it has been necessary to lay down the light sensitive coating simultaneously with the cleaning and abrading of the aluminum surface. This is due to the fact that the surface characteristics of pure aluminum change with great rapidity when exposed to air. Hence, if any delay occurs between the cleaning degreasing step and the application of the light sensitive polymer, the surface changes with the result that adherence of the light exposed coating is highly uncertain at best. In addition, plates made in accordance with this technique are still susceptible to the retention of ink in the non printing areas just as were the old style plates having no protective coating. Hence it is necessary to resort to the manual application of protective films during press stoppages, plate storage and the like. Also, and in passing, it should be noted that the so-called "Deep etch" plates, still widely used in fine color lithography, are subject to the same limitations in that they are prepared by skilled technicians starting with grained metal plates having no protective substrate of any kind.

Reference is also made to my prior U.S. Pat. No. 3,148,984 issued Sept. 15, 1964, in which the surface of the photolithographic printing plate is first contacted with an alkali metal phosphate glass-containing hydrophilic coating and then with an aqueous soluble light sensitive diazo resin. The alkali metal phosphate glass in said patent is applied by a treatment which requires elevated temperature and such elevated temperature treatment would not be desirable if applied to a developed plate since it would degrade the ink acceptive portions thereof.

It is not only desirable to protect the non-printing areas of the printing plate during storage, but it is also necessary to apply a fountain solution to the printing plate during use to maintain the non-printing areas clean while printing proceeds. The solutions usually used for this purpose contain acidic gum arabic and they must be used in considerable amounts during printing in order to maintain the non-printing areas clean. This causes undesirable emulsification of the ink.

THE INVENTION

In accordance with the invention, non-ferrous lithographic printing plates, and especially aluminum and zinc printing plates, are stabilized by application to the developed plate of an aqueous desensitizing solution comprising an alkali metal phosphate glass. The phosphate glass is preferably used in combination with a fluoride salt, such as sodium fluoride, in an aqueous medium having a slightly acid pH in the range of from pH 5 to approximately pH 7. These aqueous compositions react with the metal surface of the plate to provide a durable desensitizing action which takes place at room or moderate temperature so that the hydrophobic ink acceptive image areas, which are preferably constituted by organic solvent-soluble photo-sensitive polymers, remain undamaged by the treatment.

When developed printing plates are desensitized in accordance with the preferred practice of this invention, the hydrophilic or non-image areas of the printing plate can be maintained upon storage without special protection.

The desensitizing treatment of the invention may be utilized to desensitize the printing plate after it has been developed in customary manner, or it can be utilized as a fountain solution in the press fountain of the planographic printing press. In either event, it is to be understood that the desensitizing action involves the active metal of the non-ferrous printing plate, e.g., the aluminum or zinc surface thereof.

In connection with the utilization of the aqueous treating solutions of the invention as a fountain solution, the solutions of the invention are particularly valuable since they can be employed under only slightly acid conditions approaching neutrality and need not be utilized in large amount. As a result, the solutions of the invention do not lead to the undesirable emulsification which is characteristic of the more strongly acidic gum arabic-containing fountain solutions of the art.

Referring more particularly to the aqueous desensitizing compositions which are used in accordance with the invention, the prime ingredient is an alkali metal phosphate glass, it being appreciated that sodium is illustrative of the class of alkali metals and potassium illustrates the other more usual member of this well known class of metals. The phosphate glass is normally constituted by a polyphosphate and this class of materials will be illustrated herein by sodium hexametaphosphate. It will be particularly understood that the phosphate glass may vary considerably with respect to the mol ratio of sodium to phosphorous (a 1:1 molar ratio being typical) and that all of these varied phosphate glasses are considered to be useful in the invention. The various useful glasses are further illustrated by such standard compositions as sodium polyphos, sodium metaphosphate, and sodium hexaphos.

It is desired to point out that the phosphate glass can be used as the sole ingredient in the aqueous solution which is applied. Even in the absence of further components, the phosphate glass represents an improvement over the use of gum arabic since ink emulsification is largely avoided. On the other hand, unless further components are present in the aqueous solution, the desensitizing protection is temporary and washes off.

Insolubility in the invention is achieved through the presence of a fluoride salt which may be constituted by any metal fluoride, preferably by an alkali metal or ammonium fluoride, and most preferably by the bifluoride. Thus, while sodium fluoride and bifluoride and like salts of ammonia or potassium are preferred, other fluoride salts such as calcium or magnesium fluoride may be used.

The preferred acids for providing the desired slightly acidic pH of from pH 5 to approximately pH 7 are acids of phosphorous such as phosphoric acid, phosphorous acid or polyphosphorus acids. Phosphoric acid or $P_2O_5$-water mixtures containing the same are preferred.

Lastly, it is helpful to include a wetting agent to assist in the wetting of the non-ferrous metal surface, but the particular nature of the wetting agent is of very secondary consideration. A polyoxyethylated nonylphenol containing from 9–30 mols of ethylene oxide per mol of nonylphenol illustrates the wetting agents which may be used as an optional component in the invention. Sodium lauryl sulfate will further illustrate the useful class of wetting agent which may be ionic or non-ionic.

It is particularly desired that the aqueous compositions of the invention chemically react with the active metal surface and that this reaction take place at room or moderately elevated temperature to avoid degradation of the developed image areas on the plate. The occurrence of the desired reaction is easily observed since the reaction produces an ink repelling area. It has been found that the preferred compositions are capable of rapid reaction at approximately room temperature with the metal surface, e.g., aluminum. For this purpose, the concentration of the reagent is of significance. Thus, the aqueous solution should preferably contain from 75–300 grams of phosphate glass per 1,000 cc. of water and from 20–150 grams of fluoride salt per 1,000 cc. of water. The reaction may take place in a few seconds up to about several minutes and more usually in from 10 seconds to 5 minutes. As one might suspect, the rapidity of the reaction increases as the pH decreases within the range set forth. If the pH is too low, then pin holes and spottiness develop. On the other hand, as soon as the pH becomes even slightly alkaline, the reaction is greatly slowed. The speed of reaction also increases with increasing concentration.

While it is preferred to employ the desensitizing solutions of the invention at approximately room temperature, slight warming of the solution also helps to speed the action. Temperatures up to about 150° F. may be utilized when the concentration is minimal and the pH is approximately neutral. On the other hand, it is preferred to operate at temperatures below 120° F. and more preferably below 100° F. to minimize image degradation.

The invention is illustrated in the examples which follow.

Example 1

The listed chemicals were mixed in the proportions shown, then cooled to room temperature:

| | Formula 1 | Formula 2 |
|---|---|---|
| Water (150°F) | 1,000 cc | 1,000 cc |

| | | |
|---|---|---|
| Sodum Hexametaphosphate | 100 gm | 200 gm |
| Sodium Fluoride (NaF) | 40 gm | 80 gm |
| Phosphoric Acid | 20 gm | 40 gm |
| Polyoxyethylated Nonylphenol | 4 gm | 4 gm |

A piece of smooth aluminum sheet from which the rolling mill oil had been removed by immersing the sheet in a 5 percent solution at 120° F, of a commercial soak tank degreaser was swabbed at room temperature for 30 seconds over a portion thereof having an area of about 4 inches square with a pad soaked in the solution described above. Subsequently the whole sheet was rinsed in clear cold water and dried.

The entire face of the dry sheet was then rubbed down with a pad covered with printing ink, which resulted in the treated and untreated areas alike being covered with a thick layer of ink. The sheet was then placed in the sink, a stream of cold water played upon it and its surface swabbed with an acetate pad. The ink washed off the treated areas with ease but could not be removed from the untreated areas.

As an added test an over-aged developed aluminum lithographic plate was made up and run on the press. A number of black spots and an overall toning of press ink appeared on the copy. The aluminum plate was swabbed over its entire surface with a pad dampened with the above solution. When the press was again placed in operation the resulting copy was entirely clean and sharp, there being no spotting in the non-printing areas.

Example 2

The listed chemicals were mixed, cooled and bottled:

| | Formula 1 | Formula 2 |
|---|---|---|
| Water (150°F) | 1,000 cc | 1,000 cc |
| Sodium Hexametaphosphate | 100 gm | 200 gm |
| Sodium Bifluoride (NaF.HF.) | 100 gm | 200 gm |
| Phosphoric Acid | 20 gm | 40 gm |
| Polyoxyethylated Nonylphenol | 4 gm | 4 |

The tests described in Example 1 were made with even better results, the ink being removed from the non-image areas with greater ease and speed.

Example 3

The listed chemicals were mixed, cooled and bottled:

| | Formula 1 | Formula 2 |
|---|---|---|
| Water (150°F) | 1,000 cc | 1,000 cc |
| Sodium Hexametaphosphate | 100 gm | 200 gm |
| Ammonium Bifluoride ($NH_4F.HF$) | 40 gm | 80 gm |
| Phosphoric Acid | 20 gm | 40 gm |
| Polyoxyethylated Nonylphenol | 4 gm | 4 gm |

The tests described in Example 1 were made with uniformly good results.

Example 4

The listed chemicals were mixed, cooled, and bottled:

| | Formula 1 | Formula 2 |
|---|---|---|
| Water (150°F) | 1,000 cc | 1,000 cc |
| Sodium Hexametaphosphate | 100 gm | 200 gm |
| Potassium Fluoride (KF) | 40 gm | 80 gm |
| Phosphoric Acid | 20 gm | 40 gm |
| Polyoxyethylated Nonylphenol | 4 gm | 4 gm |

The tests described in Example 1 were made with uniformly good results.

Example 5

The listed chemicals were mixed, cooled and bottled:

| | Formula 1 | Formula 2 |
|---|---|---|
| Water (150°F) | 1,000 cc | 1,000 cc |
| Sodium Hexametaphosphate | 100 gm | 200 gm |
| Calcium Fluoride ($CaF_2$) | 40 gm | 80 gm |
| Phosphoric Acid | 20 gm | 40 gm |
| Polyoxyethylated Nonylphenol | 4 gm | 4 gm |

The tests made in Example 1 were applied with results comparable to those obtained in Example 1.

As a final check, the plates used in the press tests in the above described examples were removed from the press, swabbed with the solution employed in the example under test, dried down and stored. Approximately 120 days later each plate was placed on the press, dampened with a pad wet with fountain solution and copy was run. Excellent results were obtained from the plates used in all examples in that the previous print quality was maintained.

I claim:

1. An aqueous desensitizing solution for desensitizing a non-ferrous lithographic printing plate comprising water having dissolved therein from 75–300 grams of alkali metal phosphate glass per 1,000 cc. of water and from 20–150 grams of a fluoride salt per 1,000 cc. of water, said solution containing an acid of phosphorus to provide a pH in the range of from pH 5 to approximately pH 7.

2. A desensitizing solution as recited in claim 1 in which said fluoride salt is an alkali metal or ammonium fluoride or bifluoride.

3. A desensitizing solution as recited in claim 2 in which said alkali metal phosphate glass is sodium hexametaphosphate and said acid of phosphorus is phosphoric acid.

* * * * *